United States Patent
Beerling et al.

(10) Patent No.: US 9,625,301 B2
(45) Date of Patent: Apr. 18, 2017

(54) FLOWMETER

(71) Applicant: Krohne AG, Basel (CH)

(72) Inventors: Freek Beerling, Breda (NL); Alexander Marnix Heijnsdijk, Papendrecht (NL); Josef Neven, Mours St. Eusebe (FR); Christian Nicolas, Chatuzange le Goubet (FR)

(73) Assignee: Krohne AG, Basel (CH)

( * ) Notice: Subject to any disclaimer, the term of this patent is extended or adjusted under 35 U.S.C. 154(b) by 0 days.

(21) Appl. No.: 14/963,559

(22) Filed: Dec. 9, 2015

(65) Prior Publication Data

US 2016/0195417 A1    Jul. 7, 2016

(30) Foreign Application Priority Data

Jan. 5, 2015 (DE) .......... 10 2015 000 044
Oct. 1, 2015 (DE) .......... 10 2015 116 672

(51) Int. Cl.
*G01F 1/58* (2006.01)
*G01F 15/14* (2006.01)

(52) U.S. Cl.
CPC ............... *G01F 15/14* (2013.01); *G01F 1/58* (2013.01)

(58) Field of Classification Search
CPC ............... G01F 1/66; G01F 1/58; G01F 1/05
USPC ............. 73/861.27, 861.12, 861.24, 861.98, 73/861.79, 861.13
See application file for complete search history.

(56) References Cited

U.S. PATENT DOCUMENTS

| | | | | |
|---|---|---|---|---|
| 4,358,964 A | * | 11/1982 | Otsuka | G01F 1/58 73/861.12 |
| 4,607,533 A | * | 8/1986 | Kuroda | G01F 1/58 73/861.12 |
| 4,614,431 A | | 9/1986 | Komeyama | |
| 4,735,094 A | * | 4/1988 | Marsh | G01F 1/3263 73/861.24 |
| 5,182,952 A | * | 2/1993 | Pyzik | G01F 15/185 73/861.79 |
| 6,092,428 A | | 7/2000 | Brockhaus | |
| 6,453,754 B1 | | 9/2002 | Florin | |
| 6,564,612 B2 | | 5/2003 | Brockhaus | |
| 6,804,613 B2 | | 10/2004 | Ishikawa et al. | |
| 6,957,587 B2 | | 10/2005 | Bitto et al. | |
| 7,134,347 B2 | | 11/2006 | Bitto et al. | |
| 7,363,689 B2 | | 4/2008 | Bitto et al. | |
| 7,971,493 B2 | | 7/2011 | Hencken et al. | |

(Continued)

FOREIGN PATENT DOCUMENTS

DE    692 32 633 T2    9/2002
EP    0 704 682 A2    4/1996

*Primary Examiner* — Jewel V Thompson
(74) *Attorney, Agent, or Firm* — David S. Safran

(57) ABSTRACT

A flowmeter for flow measurement of a flowing medium having a measuring tube and a measuring device housing that can be also used in fields in which magnetic-inductive flowmeters have not previously been used or used only on a small scale—primarily due to costs is achieved by the provision a reinforcement structure is assigned to the measuring tube and/or the measuring device housing, wherein the reinforcement structure is formed of at least one reinforcement unit—preferably of several reinforcement units. The reinforcement units are preferably bolt and tube arrangements received in through-passages or external recesses formed in the housing.

8 Claims, 3 Drawing Sheets

(56) References Cited

U.S. PATENT DOCUMENTS

| | | | |
|---|---|---|---|
| 2012/0066301 A1 | 3/2012 | Holland | |
| 2015/0323356 A1* | 11/2015 | Brosnihan | G01F 1/3218 73/861.24 |
| 2015/0369376 A1* | 12/2015 | Gille | F16K 5/0407 73/198 |
| 2015/0377666 A1* | 12/2015 | Rovner | G01F 1/586 73/861.12 |
| 2015/0377668 A1* | 12/2015 | Nielsen | G01F 1/66 73/861.27 |

* cited by examiner

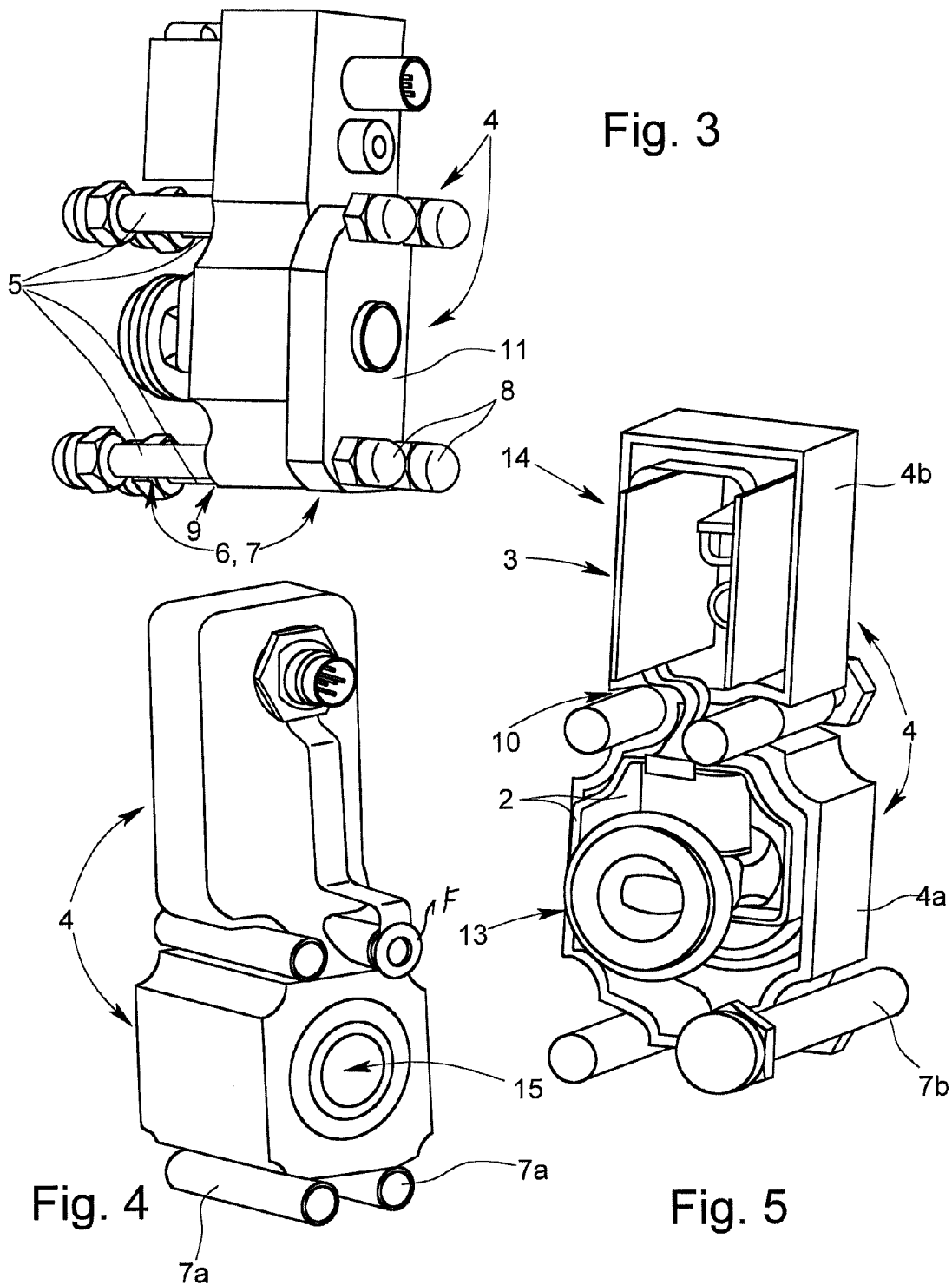

FLOWMETER

BACKGROUND OF THE INVENTION

Field of the Invention

The invention relates to a flowmeter for flow measurement of a flowing medium having a measuring tube and a measuring device housing that incorporates at least the measuring tube.

Description of Related Art

Known variations of flowmeters are, for example, magnetic-inductive flowmeters, vortex flowmeters or Coriolis mass flowmeters.

The following designs relate to examples of a magnetic-inductive flowmeter. The explanations in terms of construction, however, are valid in general for flowmeters that use other measuring principles.

Magnetic-inductive flowmeters have been known extensively in the prior art for decades. As an example, reference is made here to the citation "Technische Durchflussmessung" by professor Dr.-Ing. K. W. Bonfig, $3^{rd}$ Edition, Vulkan-Verlag, Essen, 2002, pages 123 to 167 and to the citation "Grundlagen Magnetisch-Induktive Durchflussmessung" by Dipl.-Ing. Friedrich Hoffmann, $3^{rd}$ Edition, 2003, publication of the company KROHNE Messtechnik GmbH & Co. KG.

Depending on the design, magnetic-inductive flowmeters have a magnetic field generator for generating a magnetic field at least partially interfusing the measuring tube, at least one measuring electrode for tapping a measuring voltage induced in the flowing medium, and an evaluation unit. In some designs, in particular, there are two measuring electrodes.

The basic principle of a magnetic-inductive flowmeter for flow measurement of a flowing medium is traceable back to Michael Faraday, who proposed, in 1832, the use of the principle of electromagnetic induction for measuring the flow velocity of an electrically conductive medium.

According to Faraday's law of induction, an electric field strength is formed perpendicular to the direction of flow of the medium and perpendicular to the magnetic field in a flowing, electrically conductive medium interfused by a magnetic field. Faraday's law of induction is thus exploited in magnetic-inductive flowmeters in that a magnetic field fluctuating over time during the measurement process is usually generated by means of a magnetic field generator usually having at least one magnetic field coil, and that the magnetic field at least partially interfuses the electrically conductive medium flowing through the measuring tube. Here, the generated magnetic field has at least one component perpendicular to the longitudinal axis of the measuring tube or perpendicular to the direction of flow of the medium.

If the magnetic-inductive flowmeter has at least one magnetic field generator "for generating a magnetic field running perpendicular to the longitudinal axis of the measuring tube", then the magnetic field preferably runs perpendicular to the longitudinal axis of the measuring tube or perpendicular to the direction of flow of the medium. However, it is sufficient when a component of the magnetic field runs perpendicular to the longitudinal axis of the measuring tube or perpendicular to the direction of flow of the medium.

It is also described above that the magnetic field generator is used for generating a preferably alternating magnetic field. This is not of importance for the teaching of the invention—in conformity with its origin, the objects forming its basis and the solutions for these objects—that this is an alternating magnetic field, even if magnetic-inductive flowmeters predominantly have magnetic field generators for generating alternating magnetic fields.

It is also described above that the magnetic-inductive flowmeter being discussed here also has at least two measuring electrodes for tapping a measuring voltage induced in a flowing medium, wherein the measuring electrodes preferably come into contact with the medium. Preferably, the virtual connection line of the two measuring electrodes runs at least essentially perpendicular to the direction of the magnetic field interfusing the measuring tube perpendicular to the longitudinal axis of the measuring tube. In particular, the measuring electrodes can be provided in such a manner that their virtual connection line actually runs—more or less—perpendicular to the direction of the magnetic field interfusing the measuring tube.

Finally, it is described above that the measuring electrodes are, in particular, such that they come into contact with the medium. Indeed, of course, the electric field strength generated by induction in the flowing, electrically conductive medium can be tapped by direct, i.e., galvanic measuring electrodes in contact with the medium as a measuring voltage. However, there are magnetic-inductive flowmeters in which the measuring voltage is not tapped by direct, i.e., non-galvanic, measuring electrodes in contact with the medium, rather the measuring voltage is capacitively determined.

From a functional standpoint of magnetic-inductive flowmeters of the type being discussed here, two functional units can be differentiated here, namely a first functional unit with the measuring tube and measuring electrodes and a second functional unit with the magnetic field generator, wherein an evaluation unit can also be part of the second functional unit.

Two different implementations of magnetic-inductive flowmeters are conceivable. Namely, there is a first implementation, in which the two functional units mentioned above, i.e., the measuring tube with the measuring electrodes and the magnetic field generator are already factory-set to function with one another, i.e., are components that are already factory-set to function with one another of a magnetic-inductive flowmeter that is functional when leaving the factory. There is also a second implementation, in which the two functional units are separate components that result in a functional magnetic-inductive flowmeter when the components are brought into function with one another.

In the following, the first implementation of a magnetic-inductive flowmeter is always described, i.e., the implementation in which the measuring tube with the measuring electrodes and the magnetic field generator have already been factory-set to function with one another, i.e., are components that are already factory-set to function with one another of a magnetic-inductive flowmeter that is functional when leaving the factory.

Magnetic-inductive flowmeters known from the prior art in German Patent DE 692 32 633 C2, German Patent Application DE 199 07 864 A1 and corresponding U.S. Pat. No. 6,453,754 B1, German Patent Application DE 100 64 738 B4 and corresponding U.S. Pat. No. 6,564,612 B2, German Patent Application DE 102 43 748 A1 and corresponding U.S. Pat. No. 6,804,613 B2, German Patent Application DE 10 2008 005 258 A1 and corresponding U.S. Pat. No. 7,971,493 B2 and German Patent Application DE 10 2011 112 703 A1 and corresponding U.S. Patent Application Publication 2012/0066301 A1 as well as European Patent Application EP 0 704 682 A1 and European Patent Application EP 0 834 057 A1 and corresponding U.S. Pat. No. 6,092,428 are referred to as examples.

The known magnetic-inductive flowmeters are often a "sturdy construction" in that the measuring tube and/or the measuring device housing consist/s of metal. As a general rule, these measuring tubes are tubes, i.e., cylindrical hollow bodies having a circular cross section. The measuring device housings are also often designed as cylindrical hollow bodies with a circular cross section or an essentially circular cross section. Further, it holds true for most known magnetic-inductive flowmeters that the measuring device housings have blind flanges and connection flanges consisting of metal on both sides. On the one hand, these blind and connection flanges, with which the two ends of the measuring tube are—directly or indirectly—connected, terminate the flowmeter, leading to the term "blind flange". On the other hand, the blind and connection flanges are used for connection of both sides of the flowmeter to the corresponding piping flanges, thus "connection flange".

The known magnetic-inductive flowmeters are generally produced for "industrial use". For this reason, they need to have a "sturdy construction," on the one hand, and on the other hand, need to satisfy considerable requirements for measuring accuracy.

For developing and producing magnetic-inductive flowmeters, economical aspects naturally need to be taken into consideration and these aspects are taken into consideration. Nevertheless, the costs for production are not the primary focus in the magnetic-inductive flowmeters belonging to the prior art.

The above designs are not to be limited to the measuring principle, rather are valid in large parts for other flowmeters.

SUMMARY OF THE INVENTION

Thus, the primary object forming the basis of the invention is to provide a flowmeter that can be also used in fields in which flowmeters have not previously been used or used only on a small scale—primarily due to costs. Thus, a lower-cost flowmeter is, in particular, the goal.

The flowmeter according to the invention, in which the above described and derived object is achieved, is initially and essentially wherein a reinforcement structure is assigned to the measuring tube and/or the measuring device housing and that the reinforcement structure is formed of at last one reinforcement unit—preferably several reinforcement units.

In one design, the flowmeter is a magnetic-inductive flowmeter. A magnetic field generator for generating a magnetic field at least partially interfusing the measuring tube, at least one measuring electrode for tapping a measuring voltage induced in the flowing medium, and an evaluation are thereby present. In a further design, two measuring electrodes are present. In one design, the measuring device housing also preferably accommodates the magnetic field generator and/or the measuring electrode or measuring electrodes and/or the evaluation unit, in addition to the measuring tube.

The following designs, however, are not only valid for magnetic-inductive flowmeters, but also for other flowmeters.

Above, it is stated that, inter alia, a measuring tube and a measuring device housing are part of the flowmeter being discussed here, and then it is also stated in respect to the example of the magnetic-inductive flowmeter that the known flowmeter is generally designed for "industrial use", which is why it needs to have an overall "sturdy construction". "Sturdy construction" also means that the measuring tube as well as the measuring device housing can be separately designed so that they are "easily" able to withstand all mechanical and thermal stresses.

Based on the statements mentioned above, the teaching of the invention, in which the measuring tube and/or the measuring device housing are assigned a reinforcement structure, leads to the possibility of designing the measuring tube and/or the measuring device housing of the flowmeter according to the invention in a manner that is "less sturdy", so that without the reinforcement structure provided according to the invention, possible mechanical and/or thermal stresses cannot be withstood.

What is then meant by the terms "reinforcement structure" and "assigned to"? This is explained in the following in conjunction with implementations described in detail of the flowmeter according to the invention.

According to the invention, the reinforcement structure is formed of at least one and preferably of several reinforcement units. The reinforcement units are thereby at least two separate components in one design. In an alternative design, the reinforcement units are functional elements that interact or can be designed as one piece.

In one implementation, at least one reinforcement unit is designed essentially tube-shaped and in a further design, all reinforcement units are designed essentially tube-shaped.

The tube-shaped reinforcement unit—this additionally holds true for all tube-shaped reinforcement units—is designed as a cylinder in a further implementation—in one variation, in particular, as a solid cylinder, wherein a thread—in particular an outer thread—is formed at least on one end face of the cylinder. In one design, threading is present on both end faces.

In particular in one implementation, at least one reinforcement unit is formed of two reinforcement elements. Based on this, all reinforcement units in a further design consist of several and, in particular, at least of two reinforcement elements.

In an associated implementation, the reinforcement unit is formed of a reinforcement pipe and of a reinforcement bolt penetrating the reinforcement pipe.

In one implementation, the reinforcement bolt has a thread at least on one end face. If the reinforcement bolt extends completely through the reinforcement pipe in one design, then, in particular, the reinforcement pipe is not closed on one side as in an alternative design, thus the reinforcement bolt in one design has a thread, preferably outer thread, on both end faces.

The reinforcement bolts can be provided with an outer thread over their entire length, preferably, however, only on one end or on both ends.

In one implementation, at least one reinforcement unit or, respectively, at least one end, preferably both ends of one reinforcement bolt is provided with an end cap that can be screwed onto the reinforcement bolt—in one design; this is true for all reinforcement units.

A preferred implementation of the flowmeter according to the invention is wherein the reinforcement structure is designed as a frame or as latticework, i.e., surrounds the measuring tube and/or the measuring device housing like a frame or a lattice. Here, but not only here, the reinforcement structure is formed as one piece, in particular is integrally formed, or as several pieces. In the case of several pieces, the reinforcement structure is formed of several reinforcement units.

It is indicated above that the measuring tube and/or the measuring device housing of the flowmeter according to the invention can be designed "less sturdy", i.e., can be designed so that they are not able to withstand possible mechanical and/or thermal stresses without the reinforcement structure provided according to the invention. This leads directly to yet another preferred implementation of the magnetic-inductive flowmeter according to the invention, which is wherein the reinforcement pipe and/or the reinforcement bolt consist/s of heavy-duty material, in particular of metal and/or ceramic and/or heavy-duty plastic, e.g., PEEK-polyetheretherketone. Thus, one implementation is formed of the measuring tube and/or the measuring device housing consisting of plastic and the at least one reinforcement unit—preferably all reinforcement units—consisting of metal and/or of ceramic and/or of heavy-duty plastic.

In flowmeters according to the invention, in which reinforcement pipes and reinforcement bolts are part of the reinforcement structure, the strain on the reinforcement pipes, on the one hand, differs from the strain on the reinforcement bolts, on the other hand. The reinforcement pipes are strained with pressure and the reinforcement bolts with tensile stress. Consequently, a preferred implementation of the flowmeter according to the invention taking this into consideration is additionally wherein the reinforcement pipes consist of material resisting relatively high pressures and the reinforcement bolts consist of a material resisting relatively high tensile stress.

It is part of the general teaching of the invention that the measuring tube and/or the measuring device housing of the flowmeters of the type being discussed here are assigned a reinforcement structure that can be implemented in different manners, in particular in two implementations that are described in the following.

Taking the above elaboration into consideration, a first implementation is wherein the reinforcement structure is designed to penetrate the measuring device housing. For an implementation, in which the reinforcement structure is formed of several reinforcement units, this means that the reinforcement units are arranged at least in part in recesses present in the measuring device housing.

The another implementation, that is preferred in terms of construction and mounting, is wherein the reinforcement structure surrounds the measuring device housing, i.e., is designed to enclose, more or less, the measuring device housing. This implementation is further wherein the reinforcement units are arranged at least in recesses preferably open in the longitudinal direction, provided on the outside of the measuring device housing. The recesses are thereby, for example, partially formed by an outer surface of the measuring device housing and are, in one design, only partially closed so that the recesses are partially outwardly open.

The function of the reinforcement structure provided for the flowmeter according to the invention is improved in another preferred implementation of the flowmeter according to the invention when a preferably plate-like supporting element is assigned to the measuring device housing, at least on one side, preferably on both sides. In this implementation, the additionally provided supporting elements can be pressed against the measuring device housing by screwing the end caps onto the reinforcement bolts or, respectively, in general, onto the reinforcement units on both sides.

In particular, in the last-described implementation of the flowmeter according to the invention, it is of particular advantage when the length of the reinforcement pipe corresponds to the effective length of the measuring tube. If the measuring tube has O-rings defining the length of the measuring tube on one side, preferably on both sides, then the length of the reinforcement pipe is to be chosen exactly so that it corresponds to the length of the measuring tube including the O-rings provided on its ends.

Thus, in the last-described implementation, the described pressing of the preferably plate-like supporting elements against the measuring device housing leads to a pressing against the reinforcement units or, in multiple-part design, against the reinforcement pipes, pressing the preferably plate-like supporting elements does not lead to a pressure strain on the measuring tube or to a pressure strain on the measuring device housing. Only the reinforcement pipes and the reinforcement bolts or, in general, the reinforcement units are strained as a result of pressure or tensile stress. This is the essential advantage of the flowmeter according to the invention, in which, as described further above, the measuring tube as well as the measuring device housing can be designed using a material that is relatively less durable—and thus less expensive—, in particular, of relatively inexpensive plastic.

An implementation of a flowmeter according to the invention is described above, in which the measuring device housing is assigned a preferably plate-like supporting element on one side, preferably on both sides. However, it is conceivable to use other implementations in which such a supporting element is not provided. In such implementations, piping to be connected to the flowmeter according to the invention can then have flanges on both sides, which take over the function of the preferably plate-like supporting elements provided in the implementation described above. In these implementations, i.e., in the implementations that do not have preferably plate-like supporting elements, the flanges of the piping can then be pressed against the reinforcement pipes with the help of the reinforcement bolts and the end caps screwed onto them. In this implementation, neither the measuring tube nor the measuring device housing are strained with pressure, and of course are also not strained with tensile stress.

As of yet, possible implementations of the measuring device housing belonging to the flowmeter according to the invention have not been discussed. However, there are preferred implementations in the scope of the invention. In particular, one preferred implementation is wherein the measuring device housing has two incorporating spaces, a first incorporating space, in which the measuring tube is located, and a second incorporating space, in which the evaluation unit is located. Thereby, the magnetic field generator belonging to the flowmeter according to the invention can also be located in the incorporating space, in which the measuring tube is located, or can be located in the incorporating space, in which the evaluation unit is located, or can be located partially in the incorporating space, in which the measuring tube is located and partially in the incorporating space, in which the evaluation unit is located.

In the implementation of the flowmeter according to the invention described above, in which the measuring device housing has two incorporating spaces, the reinforcement pipes or reinforcement units are preferably provided on both sides in the area of the first incorporating space. If, for example, four reinforcement pipes are part of the reinforcement structure, then they are provided quasi "in all four corners" of the first incorporating space. This makes sense because, as implemented, the measuring tube is located in the first incorporating space and, consequently, the stability of the first incorporating space is more important than the stability of the second incorporating space. In this implementation, in particular, the measuring tube carrying the medium is reinforced.

In the flowmeter according to the invention, in which the measuring device housing has two incorporating spaces, both incorporating spaces can be implemented in that the measuring device housing is formed of two housing parts connected to one another. However, an implementation is preferred, in which the measuring device housing in this respect does not consist of two housing parts, but rather a first part of the housing represents the first incorporating space and a second part of the housing represents the second incorporating space. In fact, it is recommended to implement the two incorporating spaces in the respective non-separated measuring device housing, i.e., using an inner partitioning, which naturally should not be a dividing wall, since electric contacts have to be lead from the measuring tube located in the first incorporating space to the evaluation unit located in the second incorporating space. It is additionally also conceivable, as described further above, that the magnetic field generator can be located partially in the first incorporating space and partially in the second incorporating space in flowmeters according to the invention in the form of magnetic-inductive flowmeters. Thus, partitioning of the two incorporating spaces should not prevent the implementation of a magnetic field generator being located partially in the first incorporating space and partially in the second incorporating space.

As described in detail above, there are various possibilities for designing and further developing the magnetic-inductive flowmeter according to the invention as will become apparent from the following description in conjunction with the accompanying drawings.

BRIEF DESCRIPTION OF THE DRAWINGS

FIG. 3 is, once more, a partial perspective view of an embodiment of a flowmeter according to the invention, FIG. 4 is an embodiment of a flowmeter according to the invention, FIG. 5 is another different partial perspective view of an embodiment of a flowmeter according to the invention.

DETAILED DESCRIPTION OF THE INVENTION

A magnetic-inductive flowmeter is shown as an example for a flowmeter according to the invention. However, there is no limitation to the measuring principle of the flowmeter according to the invention.

Figure 2:
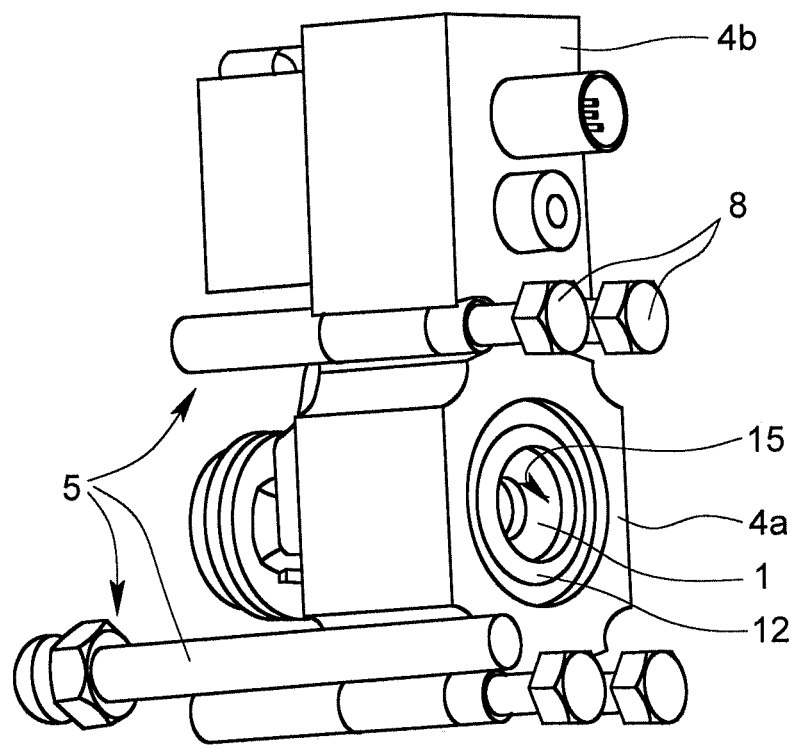
FIG. 2 is, again, a partial perspective view of an embodiment of a flowmeter according to the invention.

As described above, a measuring tube 1 having medium flowing through it, whose flow is to be measured with the help of a magnetic-inductive flowmeter according to the invention which has a magnetic field generator 2 for generating a magnetic field at least partially interfusing the measuring tube 1, two measuring electrodes 15, shown in respect to their position in FIG. 2 and FIG. 4, for tapping a measuring voltage induced in the flowing medium, an evaluation unit 3 and a measuring device housing 4 accommodating the measuring tube 1, the magnetic field generator 2 and the evaluation unit 3 are all parts of the magnetic-inductive flowmeters being discussed here as well as of the magnetic-inductive flowmeters according to the invention, which is not completely shown in the figures.

According to the invention, a reinforcement structure 5 is assigned to the measuring tube 1 and/or the measuring device housing 4; in the embodiments of the magnetic-inductive flowmeter according to the invention shown in the figures, the reinforcement structure 5 is assigned to the measuring tube 1 as well as the measuring device housing 4. This reinforcement structure 5 can, which is not true for the embodiments, be designed as a frame or as a latticework, i.e., it surrounds the measuring tube and/or the measuring device housing like a frame or a lattice.

It holds true for the embodiments of the magnetic-inductive flowmeter according to the invention shown—only partially—in the figures that the reinforcement structure 5 is formed of several pieces, i.e., is formed of several reinforcement units 6. Here, the individual reinforcement units 6 each are formed of two reinforcement elements 7, namely of one reinforcement pipe 7a and one reinforcement bolt 7b. As can be seen in FIGS. 2, 3 and 4, the reinforcement bolts 7b are provided with end caps 8 that can be screwed onto the reinforcement bolts 7b on at least one side, preferably on both sides. Thus, the reinforcement bolts 7b have an outer thread not shown. It can also be seen here that the reinforcement bolts 7b have a greater length than the reinforcement pipes 7a.

That the reinforcement pipes 7a and the reinforcement bolts 7b are made of a heavy-duty material, in particular of metal and/or ceramic and/or heavy-duty plastic, and why, is explained above. This, naturally, also holds true for the reinforcement pipes 7a and the reinforcement bolts 7b used in the illustrated embodiments. In detail, the reinforcement pipes 7a are made of a material that can withstand relatively high pressures and the reinforcement bolts 7b are made of a material that can withstand relatively high tensile stress.

It is described further above how "assigned to" can be implemented.

In the embodiment of a magnetic-inductive flowmeter according to the invention shown in FIG. 3, the reinforcement structure 5 is designed to penetrate the measuring device housing 4. The reinforcement pipes 7a are arranged in through-passages 9 provided in the measuring device housing 4.

In contrast to the embodiment according to FIG. 3, the embodiments according to FIGS. 1, 2, 4 and 5 show a reinforcement structure 5 designed to surround the measuring device housing 4. In this embodiment, namely, the reinforcement pipes 7a are arranged in recesses 10 open in the longitudinal direction provided on the outside of the measuring device housing 4 or are possibly fixed in part directly to the outer wall of the measuring device housing 4. In terms of construction and mounting, this embodiment is preferred over the previously described embodiment.

Figure 1:
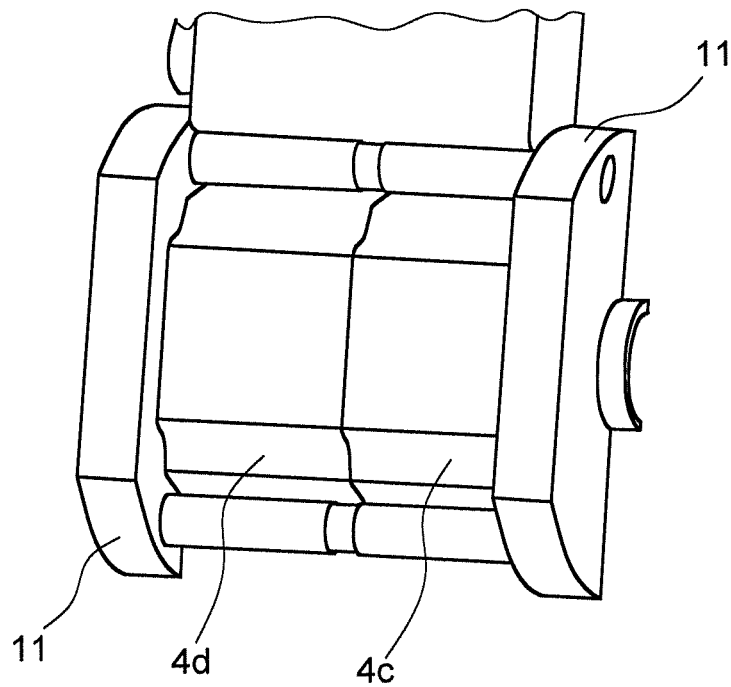
FIG. 1 is a partial perspective view of an example of a flowmeter according to the invention.

As is shown in FIGS. 1 and 2, a plate-like supporting element 11 can be assigned to the measuring device housing 4 on at least one side, preferably on both sides. In this embodiment, the additionally provided supporting elements 11 can be pressed against the measuring device housing 4 by screwing the end caps 8 onto the reinforcement bolts 7a on both sides,—correct: are pressed in the direction of the measuring device housing 4.

Embodiments of magnetic-inductive flowmeters according to the invention then have particular advantages when the length of the reinforcement pipe 7a corresponds to the effective length of the measuring tube 1. If, as is shown in FIG. 2, the measuring tube 1 has an O-ring 12 defining, correct: co-determining, the length of the measuring tube 1, then a particularly important teaching of the invention is based on the length of the reinforcement pipe 7a being chosen exactly such that it corresponds to the length of the measuring tube 1 including the O-rings 12 provided on both ends.

In the last-described embodiment, the pressing of the supporting elements 11 against the measuring device housing 4, correct: the pressing of the supporting elements 11 against the reinforcement pipes 7a, described in detail above leads only to pressing against the reinforcement pipes 7a. In the exact observance of the dimensioning of the reinforcement pipes 7a in respect to the length of the measuring tube 1 as described as fundamental in detail above, pressing the preferably plate-like supporting elements 11 does not lead to a pressure strain on the measuring tube 1 or to a pressure strain on the measuring device housing 4, when the measuring device housing does not extend beyond the ends of the measuring tube 1. Instead, on the one hand, pressure is exerted on the reinforcement pipes 7a and tensile stress is exerted on the reinforcement bolts 7b. This is the substantial advantage described above of the magnetic-inductive flowmeter according to the invention described in detail. Thus, the measuring tube 1 as well as the measuring device housing 4 can be designed using a material that is relatively less durable—and thus less expensive—, in particular of relatively inexpensive plastic.

While FIGS. 1 and 3 show embodiments of the magnetic-inductive flowmeter according to the invention, in which the measuring device housing 4 is assigned a plate-shaped supporting element 11 on at least one side, preferably on both sides, other embodiments are conceivable, in which such a supporting element is not provided. These are then embodiments, as shown in FIGS. 2, 4 and 5, in which piping to be connected to the magnetic-inductive flowmeter according to the invention has flanges that take over the function of the previously described supporting elements 11, once such flange F being show in FIG. 4. In these embodiments, the flanges of the piping can be pressed against the reinforcement pipes 7a with the help of the reinforcement bolts 7b and the end caps 8 screwed onto them. In such embodiments, again, neither the measuring tube 1 nor the measuring device housing 4 is strained by either pressure or, of course, tensile stress.

The implementation of the measuring device housing 4 belonging to the magnetic-inductive flowmeter according to the invention is also part of the invention. In this respect, a preferred embodiment is initially wherein the measuring device housing 4 has two incorporating spaces 13, 14, a first incorporating space 13, in which the measuring tube 1 is located, and a second incorporating space 14, in which the evaluation unit 3 is located. The magnetic field generator 2 belonging to the magnetic-inductive flowmeter according to the invention can be provided in the incorporating space 13, in which the measuring tube 1 is located, in the incorporating space 14, in which the evaluation unit 3 is located, or partially in the incorporating space 13, in which the measuring tube is located and partially in the incorporating space 14, in which the evaluation unit 3 is located.

In the last-described embodiment of magnetic-inductive flowmeters according to the invention, the two incorporating spaces 13, 14 of the measuring device housing 4 can, however, be formed of housing parts 4a, 4b connected to one another, as is the case in the embodiments shown in FIGS. 2, 4 and 5. Preferable, however, is an embodiment, in which the measuring device housing 4 is not formed of two housing parts 4a, 4b. Moreover, an embodiment is recommended, in which the two incorporating spaces 13, 14 are implemented with a partitioning of the interior of the measuring device housing 4. Here, this naturally should not completely be a dividing wall, since electric contacts have to be lead from the measuring tube 1 located in the first incorporating space 13 to the evaluation unit 3 located in the second incorporating space 14.

If, as described above, the measuring device housing 4 of the magnetic-inductive flowmeter according to the invention has two incorporating spaces 13, 14, then it is recommended to provide reinforcement pipes 7a on both sides of the first incorporating space 13 of the measuring device housing 4.

Finally, it should be noted that the measuring device housing 4 of the magnetic-inductive flowmeter according to the invention can be separated in a plane perpendicular to the measuring tube 1, i.e., in this respect into two measuring device housing parts 4c, 4d see FIG. 1.

Figure 6:
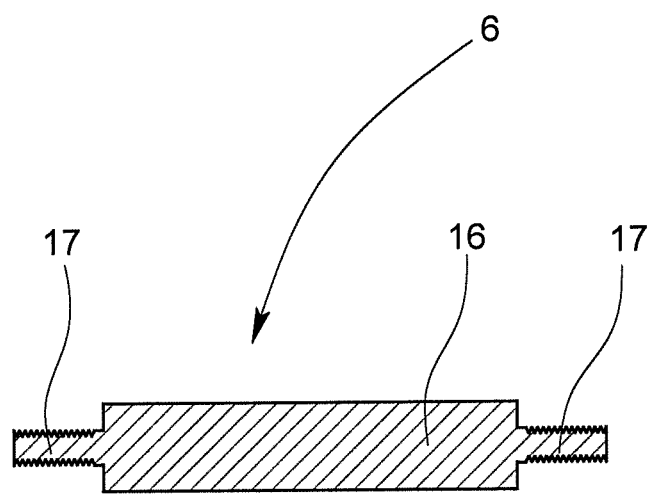
FIG. 6 is a cross-sectional view of a reinforcement unit as part of a reinforcement structure.

A particular embodiment of a reinforcement unit 6 is shown in FIG. 6. The reinforcement unit 6 is thereby designed as cylinder 16, or even a solid cylinder, wherein an outer thread 17 is formed on each of its two ends.

What is claimed is:

1. Flowmeter for flow measurement of a flowing medium, comprising:
 a measuring tube,
 a measuring device housing,
 a reinforcement structure is assigned to at least one of the measuring tube and the measuring device housing,
 wherein the reinforcement structure is formed of at least one reinforcement unit,
 wherein the at least one reinforcement unit is formed of at least two reinforcement elements, each of which is formed of a reinforcement pipe and of a reinforcement bolt penetrating the reinforcement pipe.

2. Flowmeter according to claim 1, wherein the reinforcement pipe has at least one thread formed on an end face.

3. Flowmeter according to claim 1, wherein the at least one reinforcement unit is provided, at least on one end, with an end cap that can be screwed onto the reinforcement unit.

4. Flowmeter according to claim 1, wherein the reinforcement structure comprises a plurality of reinforcements, each of which is adapted to penetrate the measuring device housing, being arranged at least in part in through-passages in the measuring device housing.

5. Flowmeter according to claim 1, wherein the reinforcement structure is adapted to surround the measuring device housing being formed of reinforcement units arranged at least in part in recesses present on the outside of the measuring device housing.

6. Flowmeter according to claim 1, wherein the measuring device housing is assigned a plate-like supporting element at least on one side.

7. Flowmeter according to claim 1, wherein an evaluation unit is present, wherein the measuring device housing has a first incorporating space in which the measuring tube is located and a second incorporating space in which the evaluation unit is located, and wherein the reinforcement units are arranged in the area of the first incorporating space of the measuring device housing.

8. Flowmeter according to claim 1, wherein the flowmeter is a magnetic-inductive flowmeter of that type having a magnetic field generator for generating a magnetic field at least partially interfusing the measuring tube, at least one measuring electrode for tapping a measuring voltage induced in the flowing medium, and an evaluation unit.

* * * * *